United States Patent [19]

Obara et al.

[11] Patent Number: 5,590,964
[45] Date of Patent: Jan. 7, 1997

[54] WIRE TEMPERATURE MEASURING METHOD FOR A WIRE ELECTRIC DISCHARGE MACHINE

[75] Inventors: Haruki Obara, Toyama; Yuki Kita; Masaya Ito, both of Minamitsuru-gun, all of Japan

[73] Assignee: Fanuc Ltd, Minamitsuru-gun, Japan

[21] Appl. No.: 199,287

[22] PCT Filed: Jul. 13, 1993

[86] PCT No.: PCT/JP93/00972

§ 371 Date: Mar. 2, 1994

§ 102(e) Date: Mar. 2, 1994

[87] PCT Pub. No.: WO94/02277

PCT Pub. Date: Feb. 3, 1994

[30] Foreign Application Priority Data

Jul. 21, 1992 [JP] Japan .................................. 4-193889

[51] Int. Cl.⁶ ........................... G01K 1/14; G01K 13/00; G01K 7/16; B23H 5/00
[52] U.S. Cl. ........................ 374/141; 374/183; 73/160; 219/69.17; 364/474.04
[58] Field of Search ................................ 374/141, 183; 219/69.17; 364/474.04; 73/160

[56] References Cited

U.S. PATENT DOCUMENTS

| | | | |
|---|---|---|---|
| 4,427,870 | 1/1984 | Inoue | 219/69.17 |
| 4,474,825 | 10/1984 | Schmidt | 219/69.12 |
| 4,675,491 | 6/1987 | Marendaz | 219/69.17 |
| 4,801,779 | 1/1989 | Obara | 219/69.12 |
| 4,825,030 | 4/1989 | Demellayer | 73/160 |

FOREIGN PATENT DOCUMENTS

| | | |
|---|---|---|
| 351436 | 1/1990 | European Pat. Off. |
| 63-156620 | 6/1988 | Japan . |
| 1-016316 | 1/1989 | Japan . |
| 3-69648 | 11/1991 | Japan . |
| 657554 | 9/1986 | Switzerland . |

OTHER PUBLICATIONS

Patent Abstracts of Japan, vol. 16, No. 203, 14 May 1992, (JP-A-04 030 916, published Feb. 3, 1992) Only abstract considered.

*Primary Examiner*—Diego F. F. Gutierrez
*Attorney, Agent, or Firm*—Staas & Halsey

[57] ABSTRACT

A wire temperature measuring method for a wire electric discharge machine by which temperature and temperature distribution of a wire can be accurately measured during electric discharge machining. After a machining voltage is cut off, a loop current flows. Based on the loop current and a voltage between electrodes measured by a differential amplifier, a resistance between the electrodes is obtained, and the temperature of a wire is obtained based on the resistance. Accordingly, the wire temperature during actual machining operation can be measured with accuracy.

4 Claims, 2 Drawing Sheets

WIRE TEMPERATURE MEASURING METHOD FOR A WIRE ELECTRIC DISCHARGE MACHINE

TECHNICAL FIELD

The present invention relates to a wire temperature measuring method for a wire electric discharge machine, and more particularly, to a wire temperature measuring method for measuring the temperature distribution of a wire in a wire electric discharge machine.

BACKGROUND ART

The machining speed of a wire electric discharge machine is greatly affected by wire disconnection. Namely, precise machining cannot be effected under conditions in which the frequency of wire cut is high, and accordingly, a machining operation has to be carried out under conditions (low cutting speed, low discharge current) less severe than such machining conditions.

Generally, wire disconnection is considered to be caused because the wire temperature locally rises and thus the wire strength lowers there, as a result of concentrated electric discharge during the machining operation, and it has been confirmed that after concentrated electric discharge actually occurs at a portion of a wire, the wire is disconnected at that portion. Therefore, efforts have been made to avoid concentrated electric discharge, for example, to control the on-off time of a machining power supply.

The most important factor in the phenomenon of wire disconnection is considered to be the wire temperature and the temperature distribution during a machining operation. Specifically, if the local temperature rise of the wire is moderate during machining operation, then it is necessary that the entire wire be cooled more intensely. Conversely, if the local temperature rise of the wire is extremely high, it is necessary to distribute the electric discharge. In any event, it is at present difficult to directly measure the wire temperature, and effective measures still remain unfound.

A first method currently implemented for measuring the wire temperature is a method in which the wire temperature is estimated based on the temperature-strength characteristic of the wire. When the wire is disconnected under certain conditions, the temperature of the disconnected portion of the wire is estimated from the tension then acting on the wire.

A second method is a method based on analysis, wherein the wire temperature is calculated based on an assumed random heating of the wire along the length thereof and an assumed heat transfer coefficient of a wire surface.

According to the first method, however, only the temperature of the disconnected portion of the wire is estimated, and it is not possible to find the temperature of the entire wire or the temperature distribution.

The second method does not take account of the effect produced by the flow of cooling water in the machining groove, which provides a dominant wire cooling effect. Thus, estimation of the heat transfer coefficient is not as effective as expected, and actual wire temperature cannot be calculated with high accuracy.

DISCLOSURE OF THE INVENTION

The present invention has been made in view of the above circumstances, and an object thereof is to provide a wire temperature measuring method for a wire electric discharge machine by which accurate measurement of wire temperature can be permitted.

Another object of the present invention is to provide a wire temperature measuring method for a wire electric discharge machine by which temperature distribution can be accurately measured.

To achieve the above objects, the present invention provides a method of measuring the temperature of a wire during a machining operation of a wire electric discharge machine, wherein a resistance value of the wire is obtained based on a loop current flowing after cutoff of a discharge voltage, and the temperature of the wire is obtained based on the resistance value.

The present invention also provides a method of measuring the temperature of a wire during a machining operation of a wire electric discharge machine, wherein an electric discharge position is detected based on upper and lower currents flowing, respectively, from upper and lower electrodes during electric discharge, a resistance value between the electric discharge position and a lower end of a workpiece is measured based on the upper current, the lower current, and a loop current flowing after cutoff of a discharge voltage, and temperature distribution of the wire is measured based on a plurality of the resistance values.

When the discharge voltage is cut off, a loop current flows due to impedance mismatching of the wire. The resistance of the wire is calculated based on the loop current, and the wire temperature is measured based on this resistance.

Moreover, the electric discharge position is detected based on the upper and lower currents. More specifically, the upper current has a large value if the electric discharge position is displaced upward, and the lower current has a large value if the electric discharge position is displaced downward. Based on the electric discharge position and the loop current, the resistance of the wire between the electric discharge position and the lower end of a workpiece is obtained. This resistance is obtained a plurality of times, whereby the temperature distribution of the wire can be measured.

BEST MODE OF CARRYING OUT THE INVENTION

An embodiment of the present invention will be now described with reference to the drawings.

Figure 1:
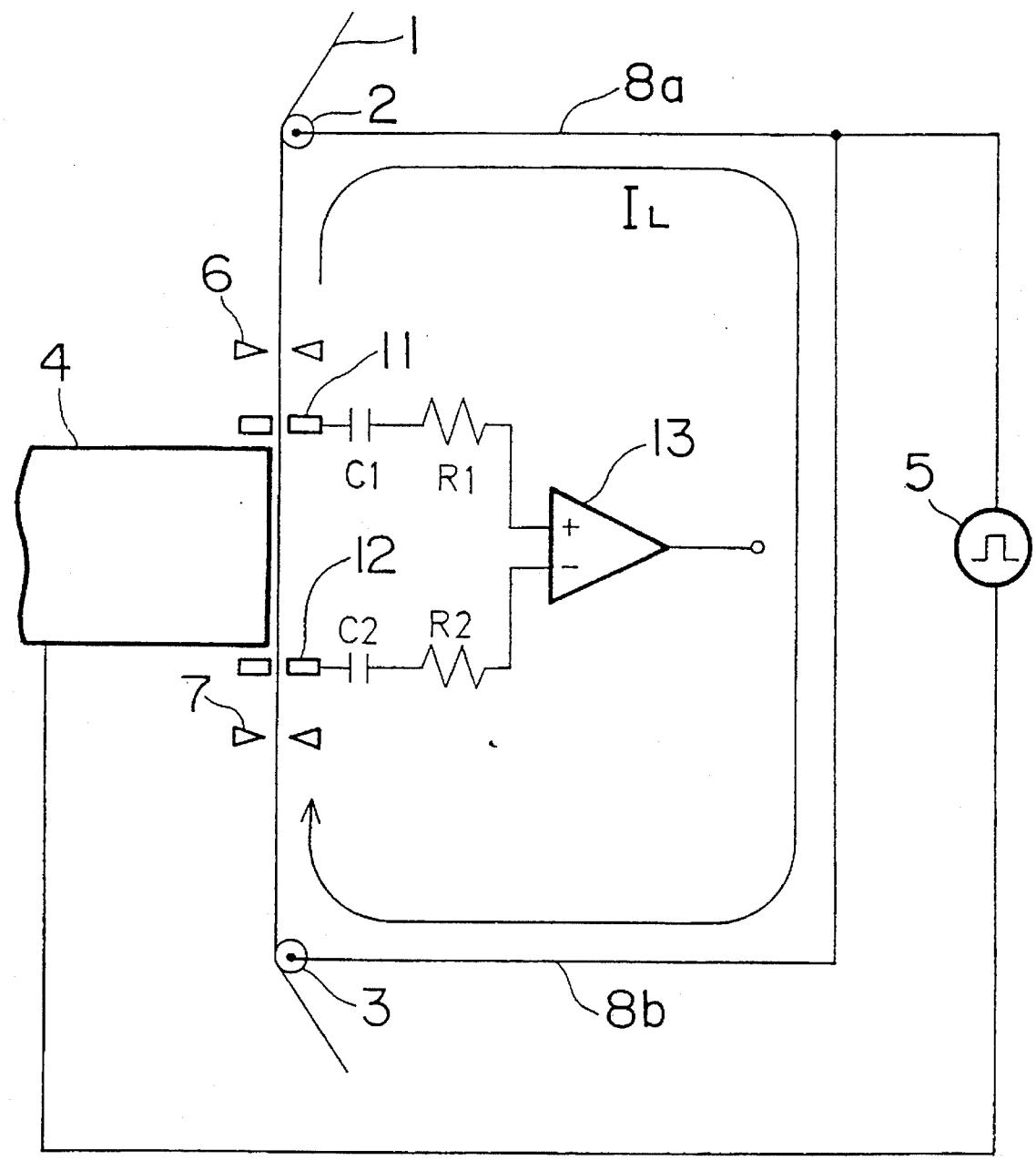
FIG. 1 is a circuit diagram illustrating a measuring circuit for measuring the temperature of a wire.

FIG. 1 illustrates a measuring circuit for measuring the temperature of a wire. A wire 1 is supplied with a discharge voltage from a machining power supply 5 via feeders 2 and 3, and the discharge voltage is applied between the wire 1 and a workpiece 4. The wire 1 is accurately positioned by means of upper and lower guides 6 and 7. After the discharge voltage is cut off, a loop current $I_L$ flows due to impedance mismatching of upper and lower feeder lines 8a and 8b.

To measure the loop current $I_L$, voltage detection electrodes 11 and 12 are arranged at the wire 1 in the vicinity of upper and lower sides, respectively, of the workpiece 4. The electrodes 11 and 12 each have a thin annular shape surrounding the wire 1 so as not to obstruct the flow of water from upper and lower nozzles, not shown. Accordingly, the wire voltage is measured based on the leakage current flowing through the water. Accurate voltage measurement is possible on condition that the polarization voltage and resistance between the wire 1 and each of the electrodes 11 and 12 are sufficiently low compared with the detected voltage and the resistance of the electrodes 11 and 12.

If a direct current is passed between the wire 1 and the electrodes 11, 12 (leakage current flowing through the water), measurement error occurs due to oxidation of the surfaces of the electrodes 11 and 12 or air bubbles produced; therefore, an AC voltage is detected by means of a capacitor coupling including two capacitor-resistor pairs, i.e., C1-R1 and C2-R2. The differential of the voltage, i.e., the potential difference between the electrodes 11 and 12, is measured by a differential amplifier 13.

Generally, the loop current $I_L$ remains constant under fixed machining conditions. Accordingly, it is possible to calculate the resistance of the wire 1 between the electrodes 11 and 12 based on the measured voltage and the loop current $I_L$, and thus to obtain the wire temperature based on the calculated resistance.

Although in the above embodiment, the measuring circuit for measuring the loop current includes a capacitor coupling, it may be constituted by a transformer coupling.

Figure 2:
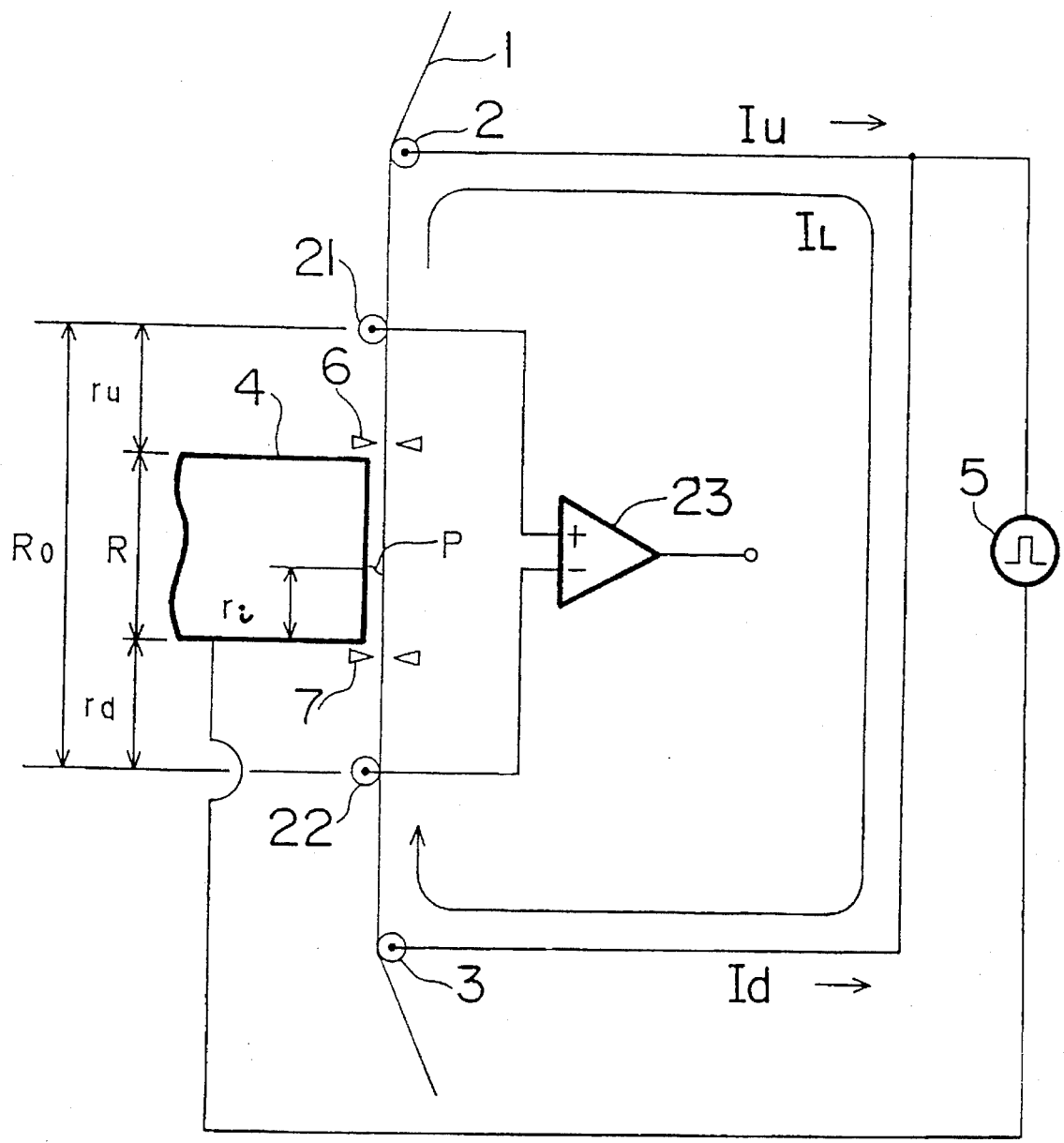
FIG. 2 is a circuit diagram illustrating a measuring circuit for measuring the temperature distribution of a wire.

FIG. 2 illustrates a measuring circuit for measuring the temperature distribution of the wire. In FIG. 2, like reference numerals are used to denote like elements appearing in FIG. 1, and a description of such elements is omitted. As shown in FIG. 2, a pair of contactors 21 and 22 is arranged between the feeders 2 and 3, and the voltage between the contactors 21 and 22 is measured. Provided that currents $I_u$ and $I_d$ flow from the feeders 2 and 3, respectively, during electric discharge, the voltage V between the contactors 21 and 22 is given by $$V = -I_u(r_u + R - r_i) + I_d(r_d + r_i) \quad (1)$$

where $r_u$: the resistance of the wire between the upper end of the workpiece 4 and the contactor 21;

R: the resistance of the wire between the upper and lower ends of the workpiece 4;

$r_i$: the resistance of the wire between the lower end of the workpiece 4 and an electric discharge point P; and $r_d$: the resistance of the wire between the lower end of the workpiece and the contactor 22.

The position P of the electric discharge can be determined from the value of the current flowing in the vertical direction in the figure.

Using the suffixes n, 1 and i for the discharge at the upper end of the workpiece 4, the discharge at the lower end of the workpiece, and the discharge midway between the upper and lower ends, respectively, then the following equations are derived:

$$V_n = -I_{un}r_u + I_{dn}(r_d + R) \quad (2a)$$

$$V_l = -I_{ul}(r_u + R) + I_{dl}r_d \quad (2b)$$

$$V_i = -I_{ui}(r_u + R - r_i) + I_d(r_d + r_i) \quad (2c)$$

While the equations are three in number, there are four unknowns $r_u$, R, $r_i$ and $r_d$, and thus it is not possible to find these unknowns. Therefore, the loop current $I_L$ flowing when the machining voltage is cut off, and the voltage $V_L$ then developed between the contactors 21 and 22 are measured. This measurement is carried out by a differential amplifier 23 connected to the contactors 21 and 22. Accordingly, the resistance $R_O$ between the contactors 21 and 22 can be obtained by the following equation:

$$R_O = r_u + R + r_d = -V_L/I_L \quad (3)$$

Therefore, from the equations (2a) to (2c) and (3), $r_u$, R, $r_i$ and $r_d$ can be obtained from the following equations:

$$r_u = (R_O I_{dn} - V_n)/(I_{un} + I_{dn})$$

$$r_d = -(R_O I_{dl} + V_l)/(I_{ul} + I_{dl})$$

$$R = R_O - r_u - r_d$$

$$r_i = [V_i + I_{ui}(R + r_u) - I_{di}r_d]/(I_{ui} + I_{di})$$

If $r_i$ is found, then the resistance of the lower end of the workpiece 4 can be obtained. Accordingly, by repeating this measurement, it is possible to measure the temperatures at a multiplicity of points. The measured values are differentiated with respect to distance, whereby the temperature distribution per unit length can be obtained.

The result of the measurement by means of the aforementioned measuring circuit revealed that the temperature of the wire rose up to about 100° C. Since the temperature at which the wire is disconnected is approximately 300° to 400° C., it is considered that wire disconnection is caused by concentrated electric discharge.

As described above, according to the present invention, the temperature of the wire is measured based on the loop current flowing after cutoff of the machining voltage, whereby the wire temperature can be accurately measured with a simple arrangement.

Further, since the electric discharge position and the current distribution are measured based on the loop current and the upper and lower currents flowing from the upper and lower feeders, respectively, the temperature distribution of the wire can be measured with accuracy.

We claim:

1. A method of measuring the temperature of a wire during a machining operation of a wire electric discharge machine on a workpiece, comprising:

supplying a discharge voltage to the wire via first and second feeders which position the wire, the first and second feeders connected to respective first and second feeder lines;

cutting off the discharge voltage;

obtaining a resistance value of the wire based on a loop current flowing, after the cutoff of the discharge voltage, as a result of impedance mismatching of the first and second feeder lines; and obtaining the temperature of the wire based on the resistance value.

2. The method as claimed in claim 1, wherein said step of obtaining a resistance value further comprises:

arranging voltage detection electrodes at respective first and second positions in the vicinities of respective first and second sides of the workpiece past which the wire runs; and measuring a voltage difference of the wire between the first and second positions to determine the loop current.

3. The method as claimed in claim 2, wherein said step of measuring the voltage difference of the wire between the first and second positions comprises:

detecting AC voltages at the respective voltage detection electrodes; and taking a difference between the AC voltages to determine the voltage difference.

4. The method as claimed in claim 2, wherein said step of measuring the voltage difference of the wire between the first and second positions comprises:

detecting AC voltages at the respective voltage detection electrodes using capacitor-resistor pairs; and taking a difference between the AC voltages to determine the voltage difference using a differential amplifier.

\* \* \* \* \*